3,442,990
METHOD OF EMBOSSING GRAMOPHONE DISCS
Alan Phillipson, Basil Harry Royston Spiller, Robin
  Smith, and Harry Cheesman, all of Decca House,
  9 Albert Embankment, London, SE.1, England
Continuation of application Ser. No. 395,875, Sept. 11,
  1964. This application Aug. 7, 1967, Ser. No. 658,689
            Int. Cl. B29c 17/00
U.S. Cl. 264—39                                  7 Claims

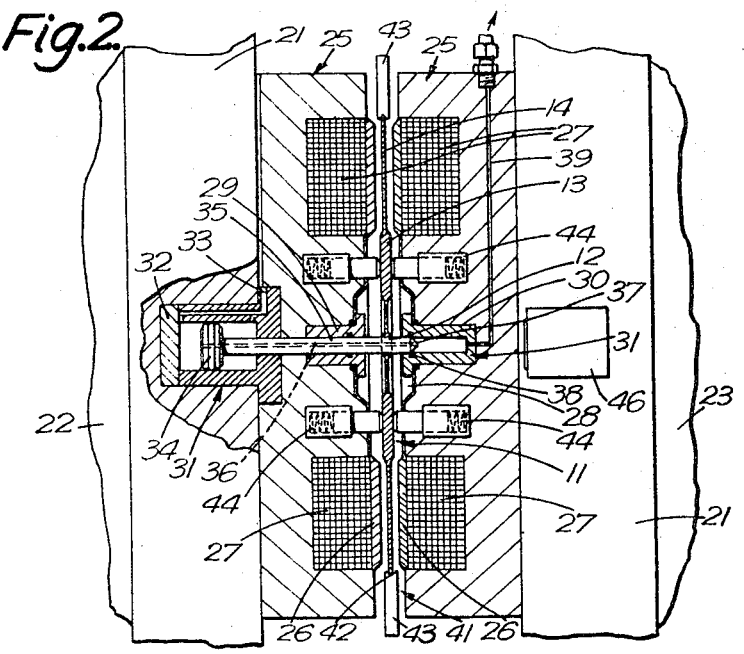

ABSTRACT OF THE DISCLOSURE

A method of embossing gramophone discs repetitively using opposed die plates; one die plate is maintained stationary while the other is retracted and advanced a short distance to emboss the discs with sound tracks, discs being fed between the die plates one at a time and taken away in between embossing strokes; finally the first die plate is withdrawn to permit changing or cleaning of the die plates.

---

Figure 1:
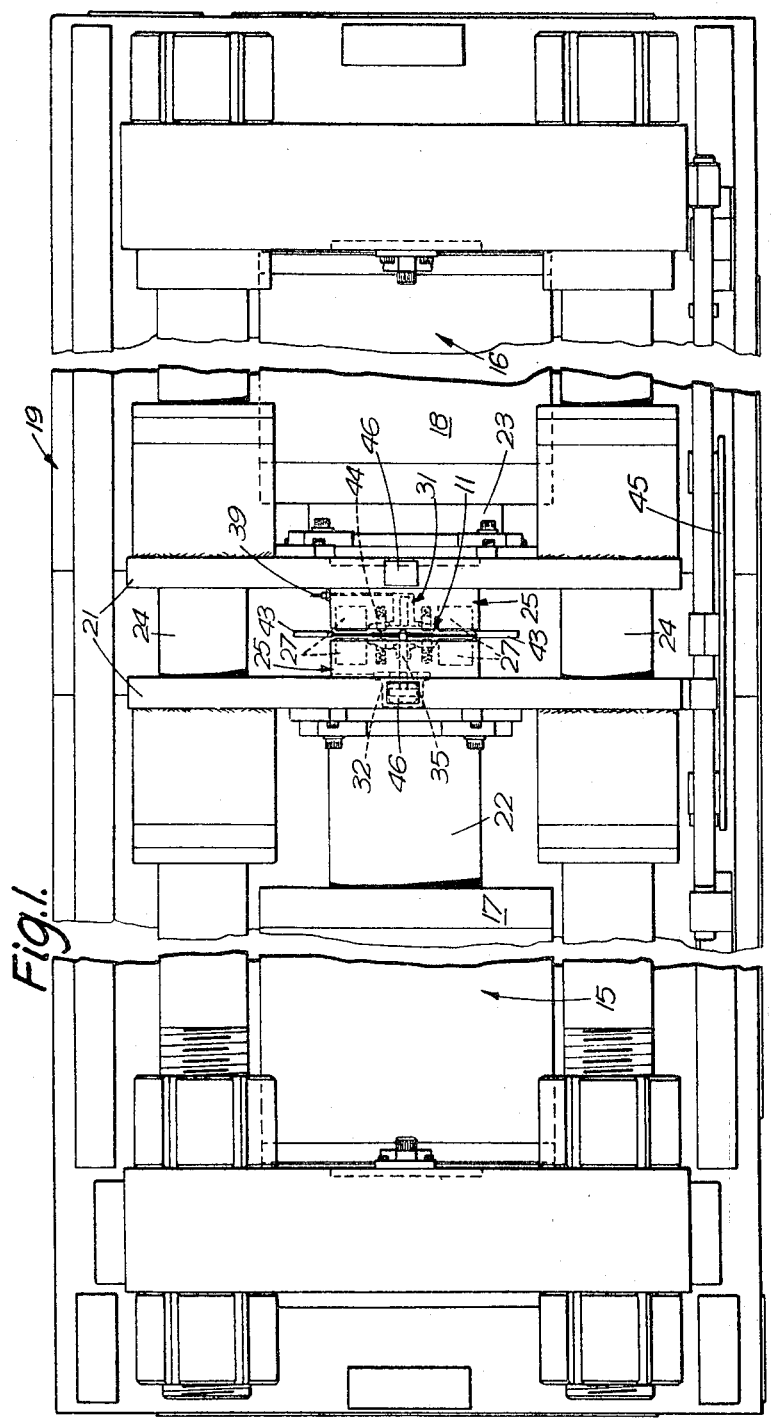

This application is a continuation of our co-pending application Ser. No. 395,875 filed Sept. 11, 1964, now abandoned.

This invention relates to making gramophone records by a method in which a blank record disc is preformed and is subsequently impressed, in an embossing press, with sound tracks.

This method of making records is particularly adapted for the automatic production of records since the embossing of a preformed disc can be effected by pressing between heated die plates and the disc can be removed from the press without cooling the die plates. This is in contrast to the conventional method of making gramophone records in which the moulding material, in the form of a powder, granules or a biscuit, is put between heated die plates which are pressed together to form the record with its sound tracks, the die plates subsequently being cooled to allow the material to set before the record can be removed from the press.

One object of the invention is an improved embossing method.

The method of embossing contemplated by the present invention essentially comprises feeding the blank discs one at a time between two die plates, maintaining one of the die plates stationary through a series of embossing operations by the other die plate and finally retracting the one die plate away from the aforementioned stationary position. The die plates are conveniently each mounted on carriers, preferably fluid pressure actuated, for moving the die plates towards one another, one of said carriers having a much longer stroke than the other and being arranged to remain stationary even when subjected to the maximum force applied by the die plate on the other carrier. With this construction, one carrier can be retracted when it is required to obtain full access to the die plates, for example, for changing the die plates, but, during normal operation for embossing discs, it is necessary only to operate the other carrier. This need only have a very short stroke, such as one half inch, merely providing room when retracted for a blank disc to be fed between the die plates and for subsequently removing the disc after it has been embossed. With a short stroke, it is readily possible to obtain high speed operation with economy of working fluid in fluid pressure actuated carriers compared with the operation of a ram which has a stroke sufficient to provide full access to the die plates.

Further objects and advantages of the invention will be apparent from the following description, during which reference will be made to the accompanying drawings, in which:

FIGURE 1 is a plan view of an embossing press, and
FIGURE 2 is a section through a central detail of FIGURE 1 on an enlarged scale.

The discs 11 are formed before feeding to the embossing press, for example by injection moulding with a central hole 12, an inner annulus 13 around the hole and an outer annulus 14 around the inner annulus on which outer annulus the sound track is to be embossed. The inner annulus 13 is thicker than the outer annulus so that when records are stacked the sound tracks of adjacent records are not in contact. The shape of the disc is set out in British standard specification 1,928 and in the International Electrical Technical Commission Publication 98/64.

The embossing operation may be carried out at a higher speed than the disc forming operation. As the demand for gramophone records is not steady throughout the year, it is convenient to use a few machines to pre-form discs steadily throughout the year and to store the discs ready for embossing at high speed when required.

When a preformed disc is to be embossed, it is removed from store and cleaned so that no contamination is pressed into the disc by the embossing dies. A suitable cleaning operation is described in our United States patent application Ser. No. 383,839 filed July 20, 1964. The embossing dies are heated, and in order to prevent distortion of the disc as might occur when the outer annulus is heated in the dies while the inner annulus remains cool, the inner annulus is pre-heated immediately before the outer annulus is embossed. A suitable pre-heating operation is described in our United States patent application Ser. No. 395,872 filed Sept. 11, 1964.

After embossing, the record disc is labelled and packed. A suitable labelling operation is described in our United States patent application Ser. No. 395,874 filed Sept. 11, 1964. Conveniently the disc passes from one operation to another by rolling or sliding down chutes.

At the embossing station, two hydraulic rams 15, 16 in opposition are mounted with their cylinders 17, 18 on a frame 19. One ram 15 exerts a maximum pressure of 180 tons and has a stroke of 6 inches. The second ram 16 exerts a maximum pressure of 150 tons and has a stroke of 5/16 inch. A platen 21 is fixed on the face of the piston 22, 23 of each ram, the platens sliding on four guide rods 24 forming part of the frame 19.

On each platen 21 is secured an annular die plate assembly 25 for embossing a sound track on the disc outer annulus 14. Each assembly 25 is provided with a stamping die 26, electric heating coils 27 and a thermostat (not shown) in the circuit of the heating coils 27 to maintain the assembly 25 at a required temperature for embossing. The stamping dies 26 are secured at a central recessed region 28 to the remainder of the assemblies 25 (indicated at 20) by hollow bushes 29, 30. The assemblies 25 have a pin and socket arrangement for aligning the two assemblies.

A locating device 31 is mounted on the axis of the die plate assemblies 25. On the first ram 15, the device 31 comprises a double acting air operated piston and cylinder unit. The cylinder 32 of the unit is mounted in a recess in the platen 21 and has a shoulder 33 extending over the platen into its die plate assembly 25. The piston 34 has a pin 35 extending through the hollow bush 29. The pin 35 has an axial bleed passage 36 extending into the extending chamber of the cylinder 32 and a front tapered portion 37.

The hollow bush 30 on the second ram 16 is located to receive the pin 35. The bush has a ring seal 38 around its mouth to seal against the pin 35 behind the front tapered portion 37. An air passage 39 leads from the second bush 30 to a remote air operated switch. The switch is not shown, being conveniently located remote from the bush 30.

In the drawings, the first ram 15 is shown with its piston 22 in the extended position and the second ram 16 with its piston 23 in the retracted position. During normal operation of the press the ram 15 is retained within the fully extended position so that when the second ram piston 23 is retracted there is a slot 41 of width 5/16" between the faces of the dies 26.

The heating station for heating the centre of the disc and the disc cleaning station, described in the above-mentioned co-pending applications, are located vertically above the slot 41 so that the disc can fall from the heating station to the cleaning station and thence to the embossing station. The rim of the disc runs in nylon grooves 42 which terminate in movable grooved catch arms 43 at the level of the embossing station.

The heated and cleaned disc is caught by the catch arms 43 in the slot 41 between the die plates 26 in an approximate position for embossing. The locating device 31 is energised and its pin 35 is urged through the spindle hole 12 of the disc 11 into the second bush 30. The tapered end 37 of the pin 35 in passing through the spindle hole 12 corrects the position of the disc 11 to the exact position required for embossing. When the front portion 37 of the piston 32 has passed through the seal 30 the seal engages the pin 35 and the air from the bleed passage 36 is trapped in the bush 30. The air pressure in the bush 30 and passage 39 builds up to operate the pressure switch at the remote end of the passage 29. Should the disc be incorrectly positioned, so that the pin 35 may not pass through the hole 12, the subsequent embossing operation is inhibited since no air is trapped in the bush 30.

When the switch operates, it causes the catch arms 43 to retract from the piston faces, the disc now being supported by the pin 35. When the catch arms 43 are fully retracted clear of the dies 26 they operate a micro-switch (not shown) which causes first ram 16 to extend to press the disc 11 between the die plates 26. The plate heating coils 27 are thermostatically controlled to retain the die plates 26 at the correct temperature for embossing the disc 11.

As the centre 13 of the disc 11 has been already heated at the pre-heating station, the heating of the outer annulus 14 of the disc during the embossing operation does not cause the disc to distort, but tends to restore it to its plane shape as the outer 14 and inner 13 annuli are restored to equal temperatures. The earlier heating of the inner annulus of the disc causes the disc to assume a dished shape, due to the difference in temperature of the inner and outer annuli, but the distortion is not sufficient to prevent the disc passing through the feed slots of the cleaning and embossing stations.

After the embossing operation, the first ram piston 22 is retracted and the locating device piston 34 is also retracted. The embossed disc is prised off the die plates by sprung ejectors 44 mounted immediately around the locating device 28, and passes down a nylon tracked chute (not shown) to the labelling station.

The piston 23 of the second ram 16 can withstand a force of 180 tons, which is greater than the 150 tons exerted by the first ram 15 during the embossing operation. The second ram 16 will therefore remain in its normal fully extended position during the embossing operation. The piston of the second ram 16 is retracted to provide access to the disc slot 41, for example for changing the die plates 26. A safety guard 45 with a central viewing window can be moved from in front of the disc slot 41, when access is required. The guard 45 operates switches in the ram actuating circuits so that the rams 15, 16 may not be moved while the guard 45 is not in its position in front of the slot 41.

Photo-electric detectors, such as that indicated at 46, are provided immediately above and below the die assemblies 25 to sense the passage of a disc to and from the embossing press. The detectors 46 are connected to inhibit the operation of ram 15 unless discs pass both detectors since the previous operation of ram 15, and no disc is jammed in front of a detector.

We claim:

1. A method of embossing sound tracks on each of a plurality of blank preformed discs, comprising the steps of: feeding each disc in its own plane between first and second facing die plates, maintaining said first die plate stationary in a first position while performing repetitive steps of moving said second die plate between a second position and a third position and from said third position to said second position, a disc being embossed each time said die plates are in said first and second positions respectively, removing an embossed disc from between said die plates while said second die plate is in said third position, retracting said first die plate from said first position in a direction away from said second position after a plurality of discs have been embossed; and further comprising, after each disc has been fed between said die plates, moving with respect to said die plates a centering pin through the central hole of said disc, sensing the passage of said pin through said central hole, inhibiting the movement of said second die plate from said third position to said second position until said passage has been sensed, and permitting said second die plate to move between said third and second positions to emboss said disc when said passage has been sensed; and retracting said pin after each disc has been embossed.

2. A method as set forth in claim 1, further comprising retracting said first die plate a distance substantially greater than the distance between said second and third positions.

3. A method as set forth in claim 1, further comprising substituting said die plates with a new pair of die plates after said retracting step.

4. A method as set forth in claim 1, further comprising cleaning said die plates after said retracting step.

5. A method of embossing sound tracks on both sides of each of a plurality of blank preformed discs, comprising the steps of: feeding each disc in its own plane between first and second die plates, maintaining said first die plate stationary at a first position by means of a relatively long stroke hydraulic ram which is in an extended position when the first die plate is in said first position; performing repetitive steps, while said first die plate is stationary in said first position, of moving said second die plate between a second position and a third position by means of a relatively short stroke hydraulic ram whose stroke is equal to the distance between said second and third positions of said second die plate, a disc being embossed by said die plates each time said die plates are in said first and second positions respectively; removing an embossed disc from between said die plates while said second die plate is in said third position; and retracting said relatively long stroke ram, to draw said first die plate from said first position, after a plurality of discs have been embossed.

6. A method as set forth in claim 7, comprising precisely centering a disc with respect to the die plates by moving a pin relative to said die plates through the central hole of the disc, sensing the completion of the passage of the pin through said central hole and inhibiting the movement of the second die plate from said third position to said first position unless said completion has been sensed; and retracting said pin after each disc has been embossed.

7. A method as set forth in claim 6 comprising sensing the departure of an embossed disc from between said die plates and the arrival of a blank disc between said die plates and inhibiting said pin passing until said departure and arrival have both been sensed.

(References on following page)

References Cited

UNITED STATES PATENTS

| | | | |
|---|---|---|---|
| 1,900,012 | 3/1933 | Ernst. | |
| 3,186,029 | 6/1965 | Joseph | 264—107 X |
| 3,236,132 | 2/1966 | Goulet et al. | |
| 1,892,134 | 12/1932 | Bishop | 18—5.3 |
| 2,438,433 | 3/1948 | Fazzio | 18—5.3 |
| 2,839,306 | 6/1958 | Bayless | 18—5.3 |

FOREIGN PATENTS 133,986  6/1933  Austria.

ROBERT F. WHITE, *Primary Examiner.*

K. J. HOVET, *Assistant Examiner.*

U.S. Cl. X.R.

18—5.3, 16; 264—107